ииб-135.
6-5-73    XR    3,736,881

United States Patent [19]
Lorinet

[11] 3,736,881
[45] June 5, 1973

[54] STANDSTILL-POSITIONING AND RESTARTING ARRANGEMENT FOR A LINEAR INDUCTION MOTOR DRIVEN VEHICLE

[75] Inventor: Jean-Paul Philippe Lorinet, Grenoble, France

[73] Assignee: Merlin Gerin, Societe Anonyme, Grenoble, France

[22] Filed: Feb. 8, 1972

[21] Appl. No.: 224,540

[30] Foreign Application Priority Data

Feb. 11, 1971  France................................7104704

[52] U.S. Cl.................104/148 LM, 310/12, 318/135
[51] Int. Cl...........................B60l 13/00, H02k 41/02
[58] Field of Search................104/148 LM, 148 MS, 104/148 SS; 214/38 BB; 310/12, 13; 318/135

[56] References Cited
UNITED STATES PATENTS

R12,620   3/1907   Slick............................214/38 BB
3,641,939  2/1972  Remy..........................104/148 LM
3,697,838  10/1972 New.............................318/135

*Primary Examiner*—Gerald M. Forlenza
*Assistant Examiner*—George H. Libman
*Attorney*—Richard K. Stevens, Davidson C. Miller, Ellsworth H. Mosher et al.

[57]  ABSTRACT

An arrangement permitting standstill-positioning and subsequent restarting of a vehicle running on a track under the action of a linear induction motor. The track and the support members on the vehicle have cooperating projections and recesses which coincide at predetermined stop-and-go points of the track to mechanically catch the vehicle and to increase the restarting force by reducing the distance between the magnetic field and armature structures of the motor.

18 Claims, 10 Drawing Figures

STANDSTILL-POSITIONING AND RESTARTING ARRANGEMENT FOR A LINEAR INDUCTION MOTOR DRIVEN VEHICLE

This invention relates to a standstill-positioning and restarting arrangement for a vehicle driven by a linear induction motor along a predetermined path.

Generally, the linear induction motor has an armature structure and a magnetic field structure, one of which is carried by the vehicle, the other extending along the path. For instance, the vehicle may carry an armature plate which co-operates with confronting portions of the pole faces of a plurality of distinct magnetic field units, or stators, regularly spaced apart along the path. Confronting portions of the armature and of the magnetic field structure define an air gap therebetween and the magnetic field structure, when polyphase energized, produces a magnetic field traveling longitudinally through the air gap to drive the armature. It has already been suggested to modulate the thrust produced by the traveling field (and, of course, the magnitude of the magnetic field itself) by varying the width of the air gap along the path of displacement of the vehicle.

It is a first object of the invention to provide a simple and reliable arrangement permitting to catch and position the vehicle in a stable way at predetermined locations (hereinafter to be called stop-and-go points) of the path.

It is a further object of the invention to provide a simple positioning arrangement providing increased restarting force of the motor to permit the vehicle to restart automatically after having been arrested at said stop-and-go points.

It is a further object of the invention to provide a simple standstill-positioning and restarting arrangement for a conveyance device comprising one or more vehicles to be moved on a surface covered by a gridwork of tracks or guide ways and to be arrested at predetermined intersections of said tracks or guide ways.

In the arrangement according to the invention the guide means guiding a vehicle along the path are adapted to mechanically catch the vehicle at the stop-and-go points and to reduce concurrently the width of the airgap by engagement of a number of projections into corresponding coincident recesses of the guide means.

The force for the holding of the interlock of the projections and recesses in position can result from the weight of the moving load or from any suitable elastic system. The positioning may result from variations in the shape of the guide way of the vehicle, for instance through cup-shaped depressions into which the support members of the movable load, for instance roller-shaped members, penetrate partially and fit. In the case of a load comprising two or more shafts, each equipped with a pair of rollers, means are provided which permit the smooth passage of the rollers outside of the stop-and-go locations.

The positioning system in accordance with the invention makes it possible to define precisely a stable equilibrium which lends itself also to a change of tracks in a particularly simple fashion. For this purpose, the moving vehicle or load may be equipped with a second series of support members capable of cooperating with at least one second track which crosses the first and the point of intersection of which with the latter also corresponds to a stable positioning location. Under the action of the linear motor, the load, brought into said position and held in said position by the catching mechanism in accordance with the invention after deenergization or neutralization of the motor associated with the first track, can be switched onto the second track by energizing the suitable motor associated with said second track.

The arrangement in accordance with the present invention also makes possible a step-by-step displacement by deenergizing or cancelling out the driving thrust of the propulsion motor immediately before or at the time of the locking engagement of the load in the next standstill position. The decrease in thickness of the gap which results from the positioning makes it possible to release the load by a new excitation of the motor the force of which is then sufficient to cause the emergence of the rollers from the positioning cup.

In the case of a linear motor applied to the propulsion of a vehicle or of a freight carriage, the magnetic field structure may be connected to the moving vehicle and cooperate with plate-shaped armatures extending along the path of displacement or, conversely, the magnetic field units may be staggered as stators along said path, each vehicle bearing then an armature plate confronting the pole surfaces of the stators. The support members of the moving part of the conveyance device can be of different types, for instance having rollers running on stationway runners or areas, or of the runner type running on members mounted for rotation around stationary shafts and staggered or arranged in space so as to define travel bands along the guide way or track. The arrangement of the positioning device in accordance with the invention is, of course, a function of the structural characteristics of the supporting and guiding device, and numerous variants can be contemplated.

The arrangement in accordance with the invention lends itself particularly well to a system for the handling and distribution of loads having a gridwork of displacement tracks arranged in intersecting columns and lines, as in checkerboards. They have already been proposed handling devices of this kind for the propulsion of loads by means of linear induction motors the stator elements of which are arranged along handling tracks, each load bearing an armature plate subjected to the action of the confronting stator elements. In the known arrangements, the loads or carriages are equipped with skates or rubbing surfaces which rest on travel tracks composed of balls or pivoting rollers. The use of balls or pivoting rollers is in particular necessary in the intersection zones of changes of direction of two tracks in which a load which has stopped in a given position can be displaced at right angles to the prior displacement along a perpendicular branch track. The positioning of the load in a switching zone is effected by subdivision of the active stator element into two parts and by feeding of the latter in such a manner as to produce opposite forces of displacement of the load the centering of which takes place after successive oscillations of decreasing amplitudes. The present invention makes it possible to improve and accelerate the positioning at a precise point by adding to the positioning by opposing thrust a mechanical releasable locking engagement.

The known support balls of the load are fragile and of unreliable operation, their resistance to rolling varying in particular with their degree of dirtying. In accordance with one development of the present invention, the travel tracks consist of rollers mounted for rotation on stationary shafts extending perpendicular to the general direction of the track so as to permit easy rolling on the load on said roller track. The zones of intersection of the tracks are equipped with crossing rollerways and correspond to positioning locations of each track in such a manner that a carriage moving on one of the tracks is caused to stop at a central position adapted to enable it to move subsequently along any of the switching tracks or directions selected. The relative positioning of the rollers is, of course, so adapted as to permit the passage of the carriage after the lifting phase corresponding to the departure from the stillstand position.

The use of rollers with fixed shafts facilitates the guiding of the moving loads or vehicles and permits a rapid damping of the oscillations around the stillstand position constituting a position of stable equilibrium. For this purpose, the rollers are advantageously mounted elastically so as to slide axially when they come into contact with a runner of the load which becomes locked in the stillstand position. The elastic mounting also facilitates the separation of the moving load from the rolling members of the non-selected track, this separation taking place positively during a movement of translation having a component perpendicular to the orientation of the rollers of the non-selected track. This displacement is compensated for by a slight sliding of the rollers along their shaft until the removal and freeing of the rollers which automatically return into their position of equilibrium under the action of the elastic forces acting on them.

In the case of an armature of ferromagnetic material, an intense force of attraction acts between the magnetic field structure and the armature structure tending to cause the latter to stick to each other. This force increases greatly as a function of the decrease in the spacing or distance present between the two structures, and it is easy to understand that in a stillstand position with decreased air gap it is capable of assuming high values which effectively lock the moving in the stillstand position. This large force adds to that corresponding to the weight of the vehicle and must be overcome by the thrust of the linear motor for a releasing of the moving load. It is possible to overcome this additional attraction partially by utilizing an armature element of a non-ferromagnetic conductive material, such as copper or aluminum. This matter solution seems preferable in ordinary handling installations in which the locking force should preferably depend only slightly on the width of the airgap between the armature and magnetic field structures.

Other advantages and characteristics of the invention will become evident from the following description of several embodiments of the invention, given by way of illustration only and which have been shown in the accompanying drawings in which.

Figure 1:
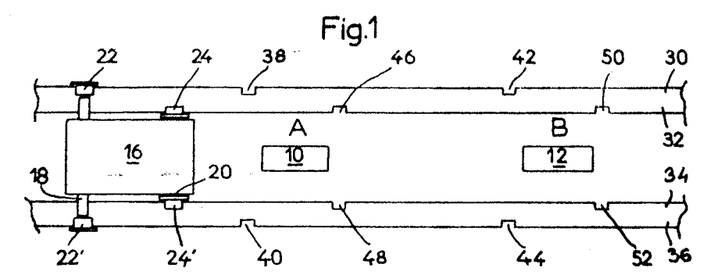
FIG. 1 is a schematic plan view of a conveyance device equipped with a positioning device in accordance with the invention.
Figure 2:
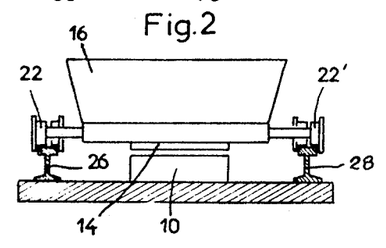
FIG. 2 is a side view on a larger scale of the installation shown in FIG. 1.

In FIGS. 1 and 2 a linear induction motor comprises a magnetic field structure composed of stator elements 10, 12 staggered along a path of displacement of an armature element 14 capable of moving in the direction of traveling of the magnetic field produced by the polyphase energizable elements 10, 12. The armature element is connected to a movable load schematically represented by a vehicle or carriage 16 the frame of which is equipped with two spaced axles 18, 20, each of which bears a pair of support rollers 22, 22', 24, 24'. The rollers 22, 22', 24, 24' are adapted to roll on rails 26, 28 which constitute a track extending in the said direction of displacement and guiding the moving load in such a manner as to maintain a substantially constant distance or gap between the plate-shaped armature element 14 and the airgap or pole surface of the stator elements 10, 12 which extend along the track. Such arrangements are well known and it is obvious that this example of handling installation has been selected only to facilitate an understanding of the description which follows. The armature plate 14 can actuate any mobile.

The rollers 22, 24 and 22', 24' are disaligned with respect to each other so as to cooperate with different travel paths or raceways of the rails 26, 28 respectively, shown in FIG. 1 at 30, 32 and 34, 36. The track 26, 28 has two positioning locations or stop-and-go points A, B corresponding to zones of stopping of the vehicle 16, in which the paths 30 to 36 are provided with notches or recesses 38, 40, 42, 44 adapted to receive the rollers 22, 22' and 46, 48, 50, 52 arranged opposite the rollers 24, 24' capable of engaging therein. The distance between the notches 38, 40 and 46, 48 corresponds, of course, to the distance between the axles of the rollers 22, 24, 22', 24'. During the displacement of the carriage 16 along the track 26, 28, the rollers 22 to 24' embed themselves in the corresponding notches in the positions A and B so as to define the positioning locations of stable equilibrium in which the carriage 26 is held by its own weight. The penetration of the rollers 22 and 24' in the notches of the rails is accompanied by a slight lowering movement which decreases the spacing or airgap between the armature 14 and the facing stator surface 10 or 12. The decrease in the gap of the linear motor is accompanied in a known manner by an increase in the force of propulsion which is beneficial for permitting the releasing by lifting of the rollers 22 to 24' from the notches. The stators 10 or 12 must, of course, be deenergized at the proper moment upon the arrival of the carriage 16, detected in any manner to permit the stopping of the latter in position A or B. It is also possible to divide the stator in the positioning zone into two active elements acting in opposite directions which urge the carriage towards a central equilibrium position corresponding to the stillstand position defined by the notches provided in the rails. In such a variant the positioning of the carriage 16 is fully assured, any excess movement being accompanied by an increased centering effort which brings the vehicle back towards the central position where it rests after a number of oscillations.

The invention also applies to installations in which the magnetic field structure of the linear motor is carried by the carriages 16, the armature elements being then in the form of stationary plates arranged along or constituting the rolling and guiding track of the carriages 16. This type of installation is more particularly suitable for tracks of very great length which would otherwise require costly wound stator elements. The decrease in the gap of the motor at the standstill points is obviously retained in full in this type of installation.

Figure 3:
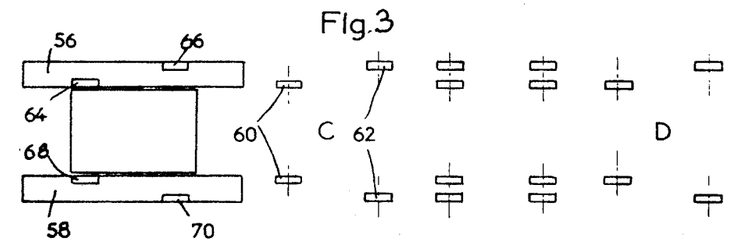
FIG. 3 is a view similar to that of FIG. 1, showing a variant of the invention comprising stationary roller members defining a displacement track.
Figure 4:
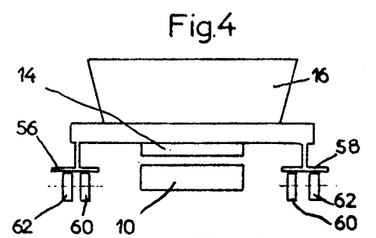
FIG. 4 is a side view similar to that of FIG. 2 of the installation shown in FIG. 3.
Figure 5:
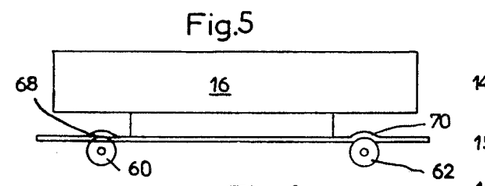
FIG. 5 is an elevation on a larger scale of the installation shown in FIG. 3.

The nature of the guide and support elements of the carriages 16 may be different, and FIGS. 3 to 5 show a variant embodiment of the invention in which the load 16 is equipped with a pair of elongated lateral runners 56, 58 capable of sliding on travel paths formed of rollers 60, 62 extending along the entire length of the path of the carriage and which are mounted for rotation on fixed horizontal shafts extending perpendicular to the path. Positioning recesses or cups 64, 66 and 68, 70 are provided in runners 56 and 58, respectively, and longitudinally spaced so as to coincide with the rollers 60 and 62 at the standstill or stop-and-go points, such as C, D, where a pair of rollers 60 is received by the recesses 64, 68 and another pair of rollers 62 by the recesses 66, 70 to position the carriage 16. On the path intermediate the points C and D a sufficient number of support rollers permits the passage of the recesses 64 to 70 without possibility of engagement of the latter on one of the rollers. This may be obtained by disposing, as shown, pairs of rollers 60 and 62 on the same transverse axis. The operation of this installation is, of course, analogous to that of the embodiment of FIGS. 1 and 2, only the respective position of the support and guide members being different.

Figure 6:
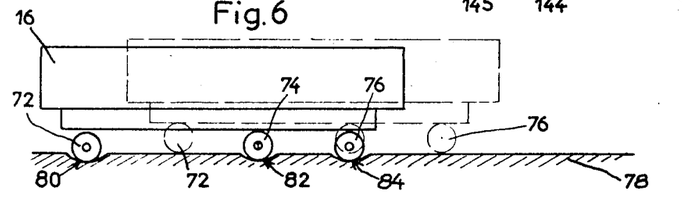
FIG. 6 is a view similar to that of FIG. 5, showing another variant of the invention with a movable load equipped with rollers.
Figure 7:
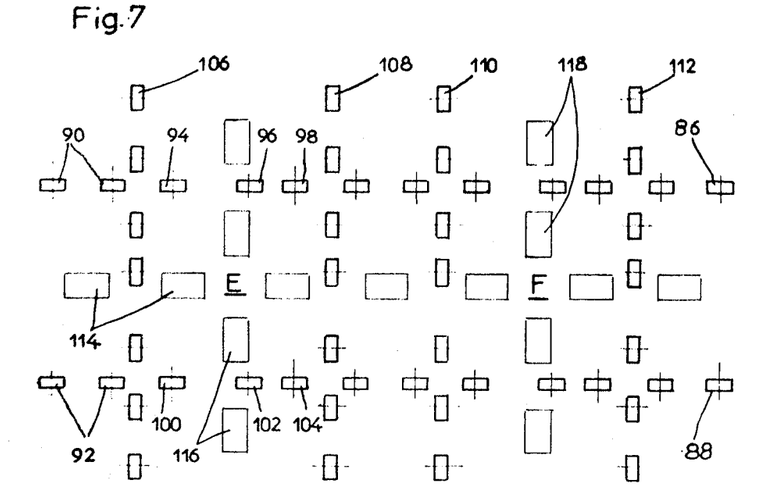
FIG. 7 is a schematic plan view of parts of a handling installation of the checkerboard type comprising intersecting load rolling tracks equipped with positioning devices in accordance with the invention.

In the example shown in FIGS. 1 and 2, each of the rollers 22, 22', 24, 24' of a carriage 16 has its own displacement path so as to prevent the notches 38 to 52 hindering or disturbing the passage of the other rollers. FIG. 6 illustrates a variant embodiment of the invention similar to that of FIGS. 1 and 2 but with a travel path in the form of a single rail or area for all the rollers secured to the carriage 16. The carriage 16 is equipped with three axles 72, 74, 76, each bearing a pair of rollers, the intermediate axle 74 being closer to the axle 76 than to the axle 76. In a stop-and-go position, shown in solid lines in FIG. 6, the track or rolling area 78 has transverse grooves or depressions 80, 82, 84 of rounded shape the spacing of which corresponds to the distance between the axles 72, 74, 76, respectively, so as to permit an engagement of the rollers in coincident mating grooves and a locking by lowering of the carriage 16 in this position. It is seen that such a lowering is possible only if all of the rollers of the axles 72, 74, 76 are facing an associated groove and, by way of example, there has been shown in dashed line the position of the carriage 16 at the time the rollers of the axle 74 clear a groove 84. In this position any positioning engagement is prevented, the carriage 16 being only supported by the end rollers 72 and 76. In this way one avoids jumps upon passage over grooves when the carriage rolls beyond the positioning locations. Of course, the position of the center of gravity of the carriage should be taken into consideration, particularly upon the passage of the end rollers, so as to avoid a possible tilting of the carriage. Additional roller axles and grooves can be provided. FIG. 7 shows by way of example an installation having fixed rollers capable of cooperating with support runners carried by the moving load and comprising two positioning locations or stop-and-go points E, F provided in switching zones in which side tracks extend perpendicular to the main track. The main track is formed of two travel paths 86, 88, each comprising aligned rollers 90, 92 idly mounted on fixed horizontal axles extending perpendicularly to the direction of the travel path, the spacing of the successive rollers in the zones of normal travel being determined in such a manner as to assure at all points support of the runners coming into contact with them. At the positioning locations E, F each travel path 86, 88 has three rollers 94, 96, 98 and 100, 102, 104, respectively, arranged in pairs and spaced in accordance with a given pattern corresponding to that of the recesses provided in the runners carried by vehicle (not shown in FIG. 7). A positioning by mechanical catching is effected at least at any desired stopping point of the track 86, 88 by an arrangement of the rollers identical to that of the location E. The positioning locations advantageously correspond to switching zones where intersecting branch tracks extend perpendicularly to the main track 86, 88. Each of these travel path tracks 106, 108 and 110, 112 is preferably developed in a manner identical to that of the track 86, 88, the support rollers of the different tracks imbricating in the crossing zones E and F. The carriage, not shown in FIG. 7, must, of course, be equipped with pairs of runners capable of cooperating with the perpendicular tracks. The arrangement of such a bifurcation or intersection will become more evident from the following description of a variant embodiment shown in FIG. 8. The crossing points E, F correspond to a positioning location for each of the corresponding tracks. The tracks 86, 88, 106, 108 and 110, 112 comprise a plurality of fixed stator elements 114, 116 and 118 respectively aligned in the general direction of the corresponding track. In a manner known per se, the position locations E and F comprise at least two stator elements of each of the tracks, said elements, which are arranged in a cross, being capable of being fed selectively so as to exert a thrust in one direction or the other on the vehicle. Two elements of one and the same track may be energized in opposite directions to center the carriage in said position of stop. The combined centering action by electromagnetic forces and by mechanical catching forces makes it possible rapidly to dampen the oscillations around the equilibrium position and to maintain the movable load in the stillstand position even after elimination of the electromagnetic force, that is to say, the deenergization of the stator elements.

The selection of the track of travel is effected by excitation of a series of corresponding stator elements, said excitation producing a movement in the selected direction which causes a lifting and a disengagement of the vehicle. Such a lifting makes it possible to separate the runner from the travel rollers of the track which has not been selected.

Figure 8:
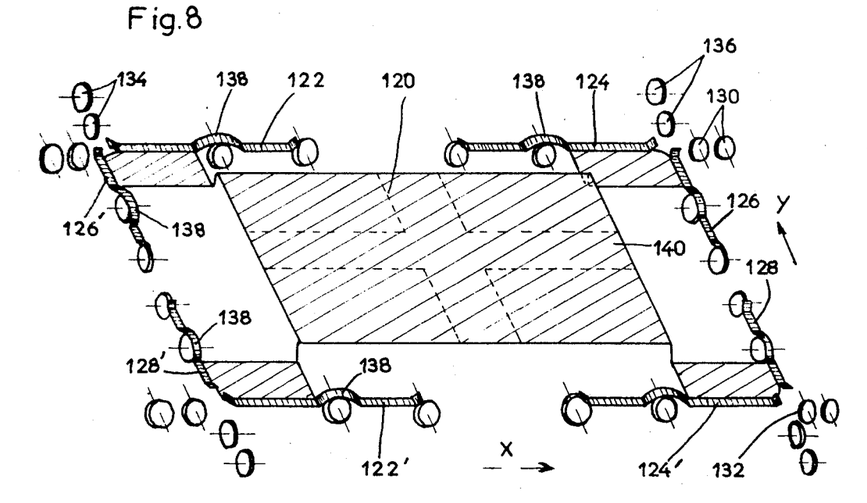
FIG. 8 is a schematic view in perspective of a positioning zone of the installation of FIG. 7, only the lower part of the support of the load being shown.
Figure 10:
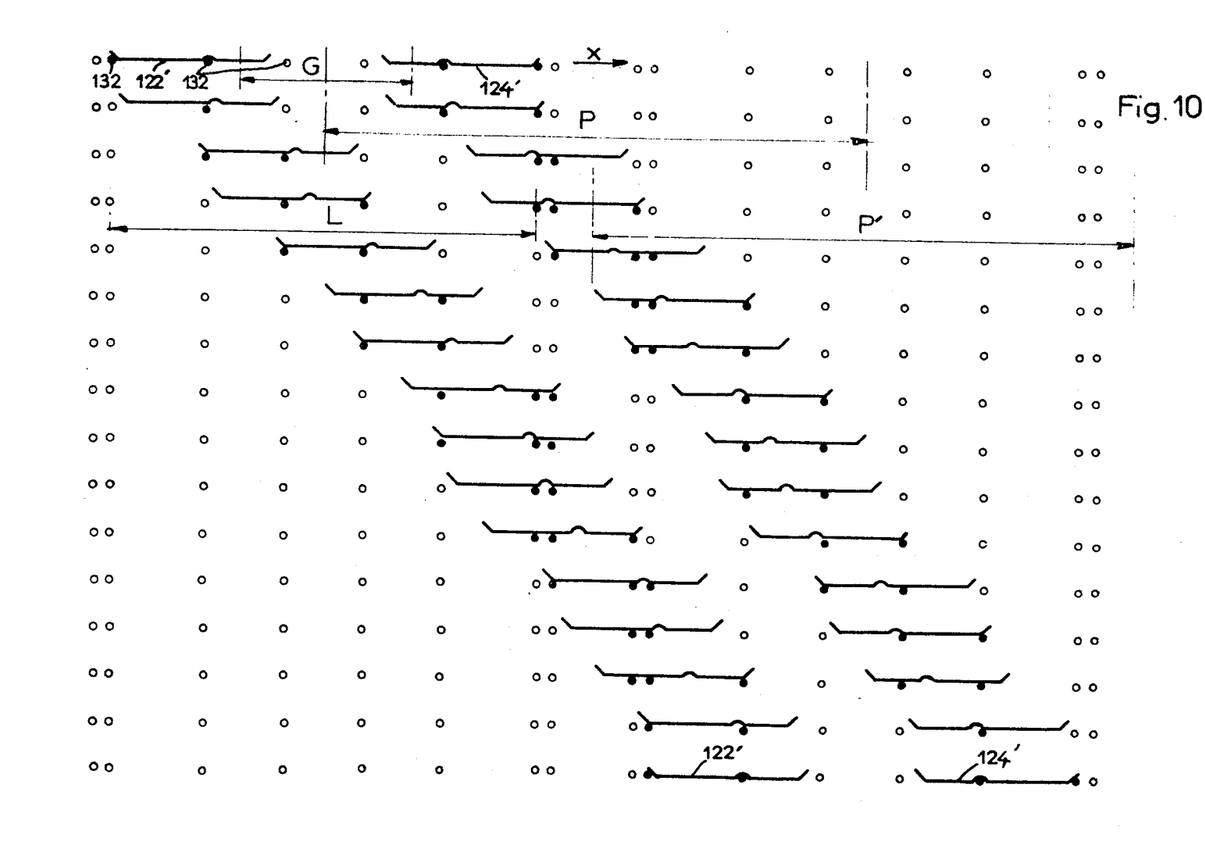
FIG. 10 is a schematic view illustrating the relative position of the rollers of a rolling track according to FIG. 7, permitting step-by-step displacement with a lowering of the change only in the standstill points; in this figure various successive positions assumed by the load during its displacement have been shown.

The positioning and transfer device in accordance with the invention may be applied to a handling system comprising a gridwork of rows and columns of load travel tracks known as checkerboard handling system. FIG. 8 shows by way of example in perspective a positioning location corresponding to the crossing of a row and a column of travel tracks of such a checkerboard. The carriage or supports of the loads, schematically represented by the flat surface 120, are equipped with four pairs of runners, two of which pairs 122, 122' and 124, 124' extend in the direction of displacement indicated by the arrow X in FIG. 8, while two other pairs thereof, 126, 126' and 128, 128' extend in a direction at right angles indicated by the arrow Y. The runners 122 to 128' laterally surround the frame 120 and the armature (not shown) carried by the vehicle in substantially rectangular or square shape. A travel track extending in the direction of the arrow X is formed of two series of rollers 130, 132 idly mounted on horizontal axles extending parallel to the direction Y. The transverse distance between the series of rollers 130, 132 corresponds to the distance between the runners 122, 122', 124, 124' in such a manner that the vehicle 120 is capable of sliding along said track X while being supported by the runners rolling on the rollers 130, 132. In a similar manner, two series of aligned rollers 134, 136 extend parallel to the direction indicated by the arrow Y to form a second travel track on which the runners 126, 126', 128, 128' are capable of rolling for displacement of the movable load 120 in a direction along the arrow Y. Each runner 122 to 128' has a cup-shaped depression 138 in which there can house itself a circumferential portion of a roller of one of the travel tracks in engaged or lowered position of the frame 120. The length of each runner 122 to 128' is, of course, adapted to the longitudinal spacing of the respective support rollers 130 to 136 and the ends are carried upward to improve the smooth passage of the runners on the rollers. The assembly is arranged in such a manner that each runner rests on at least two rollers in any intermediate position between two positioning locations and it is easy to understand that under these conditions the load is at all time supported at at least four points avoiding any lowering engagement of runners on any roller in all intermediate positions. In the positioning location, however, each runner is supported by a single roller which coincides with the corresponding cup which fits therein. FIG. 10 schematically illustrates the relative positioning, for instance of the runners 122', 124' which cooperate with the rollers 132, for different positions of the frame or carriage 120 moving in the direction of the arrow X. The rollers in engagement are indicated in the figure by solid circles, while the free rollers are indicated by empty circles. The letter L indicates on FIG. 10 the minimum length of the carriage 120, the letter G indicating the zone in which the center of gravity of the moving load 120 must be located. The distance between two positioning or stop-and-go locations is indicated by the letter P which corresponds to the pitch of the lines or columns of the checkerboard. The size of the boxes of the checkerboard is indicated at P'.

It is needless to describe in detail the different phase of displacement illustrated in FIG. 10 and it will be merely pointed out that the phase illustrated in the first line and the last line correspond to positioning locations, the movable load having been transferred towards the following column. The frame 120 of the movable load comprises a cross-shaped armature schematically indicated in dashed line 140 in FIG. 8, capable of cooperating with stator elements which are not shown but are similar to those in FIG. 7. The arrangement of the rollers 130 and of the associated runners 122, 124 is obviously symmetrical to the previously described arrangement of the rollers 132 and the associated runners 122' and 124'. The same arrangement is employed again for the rollers 134 and 136 as well as the associated runners 126, 126', 128, 128' of the track extending in the direction indicated by the arrow Y.

The functioning of the arrangement illustrated in FIGS. 8 and 10 is evident from the description previously given. A carriage 120 moving in the direction indicated by the arrow X under the action of the linear motor, and more particularly of the stators arranged parallel to said direction, is supported by the runner 122 and 124' traveling on the travel paths formed of the rollers 130 and 132 respectively. At the moment when the movable load reaches the position shown in FIG. 8, the recesses or cups 138 of the runners 122 to 124' fit on the corresponding support rollers 130, 132 which alone are facing the runners 122 to 124'. The movement of the engagement of the runners is accompanied by a lowering or descent of the frame 120 and therefore a movement of the armature 140 towards the pole surface of the stators, one of which is energized from this moment on, in opposite direction so as to urge in a known manner the frame 120 towards the centering position illustrated in FIG. 8. In case of overshoot, the action of the stator acting in opposite direction tends automatically to return the movable load towards the engagement position. It should be noted that the cups 138 of the runners 126, 126' and 128, 128' corresponding to the orthogonal direction of displacement Y also come into the position shown in FIG. 8 opposite a support roller which is alone facing the said runners. The lowering movement due to the engagement of the runners 122 to 124' is therefore permitted by engagement of the recesses of the runners 126 to 128' with rollers 134, 136 of the perpendicular track. Starting from the stillstand position indicated in FIG. 8, the movable load 120 can be displaced either in the direction X by exciting the stator elements oriented in said direction or in the direction Y by exciting the stator elements associated with this direction of travel. The small gap present between the armature 140 and the excited stator elements makes it possible to have a substantial thrust capable of disengaging the cups 138 from the support rollers. In case of a displacement in the direction indicated by the arrow X, the rollers which come into contact with the inclined surfaces of the cups 138 cause a lifting of the runners 122 to 124' and therefore a lifting of the frame 120 and of the associated runners 126 and 128'. This lifting makes it possible to remove these last-mentioned runners away from their support rollers, avoiding any sliding or rubbing which might substantially increase the resistance to advance. For this purpose it is advantageous to round the travel surface of the rollers so as to facilitate the separation of the runners from said surfaces. In similar manner, displacement along the direction Y causes a lifting of the frame 120 by the action of the rollers 134, 136 on the marginal curved portions of the cups 138 of the runners 126 to 128', which lifting moves the inactive runners 122 to 124' away from their support rollers 130, 132. The change in path or direction of travel of the movable load 120 therefore takes place automatically by simple selection of the excited stator without requiring any change in the support or guiding members.

Figure 9:
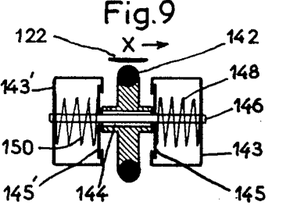
FIG. 9 is a detail view of FIG. 8, showing a possible mounting of a roller member.

FIG. 9 shows a variant embodiment of the invention which makes it possible to reduce the frictional forces exerted by the positioning rollers in the case of displacement along a perpendicular direction. The bushing 144 of the roller 142 is mounted for rotation and sliding on a fixed axle 146. The roller 142 is surrounded by elastic stops consisting of fixed housings 143, 143' integral with the axle 146 and one of the ends 145, 145' of which adjacent the hub of the roller 142 is mounted movable while being urged in the direction of the roller 142 by compression springs 148, 150 interposed between the ends 145, 145' and the housing 143, 143'. The relative displacement of the ends 145, 145' is limited in the direction of the roller 142 by collars of the fixed housing 143, 143'. It is easy to see that a runner, schematically shown at 122, which moves in the direction of the arrow X and comes into contact with the surface of the positioning roller 142 is capable of driving the latter axially during the engagement phase in opposition to the action of the spring 148. The lateral displacement of the roller 142 avoids any friction between the runner and the roller 142 while permitting return to the initial position of the roller 142 upon the release of the latter by a lifting of the runner due to the disengagement of the movable load from the rest position. The arrangement is, of course, bi-directional. Any other suitable system, for instance a slight relative pivoting of the roller permitted by a certain flexibility, makes it also possible to obtain the desired result.

The interlocking or catching force depends on the profile of the marginal edges of the depressions or recesses 138 and the slopes will be of greater or lesser steepness, depending on the effect desired.

The invention is, of course, in no way limited to the embodiments which have been more particularly described and shown in the accompanying drawings but it rather extends to any variant remaining within the scope of mechanical or electrical equivalents, and particularly to the variant in which the stator structure or the linear motor is borne by the movable load, the armature structure being stationary to extend along the travel tracks. Any of the support and guide arrangements described with reference to FIGS. 1 to 7 can obviously be utilized in a handling system of the checkerboard type more particularly described with reference to FIGS. 8 to 10.

What is claimed is :

1. A standstill-positioning and restarting arrangement for a vehicle having support members running on a linearly extending track under the action of a linear induction motor device including a magnetic field structure cooperating with an armature structure, one of said structures being movable with said vehicle, the other structure extending along said track so that the value of the driving force exerted by said linear induction motor device on said vehicle is governed by the distance between confronting air gap faces of said structures, respectively, said support members and said track being adapted to mechanically catch and position said vehicle and to reduce said distance at predetermined stop-and-go points of said track.

2. A conveyance device to propel a vehicle along a predetermined path and to arrest and restart the vehicle at predetermined stop-and-go points of the path, comprising :
   support and guide means to support and guide said vehicle along said path;
   a linear induction motor device having a magnetic field structure and an armature structure, one of said structures being movable with said vehicle, the other structure being stationary and extending along said path, said structures defining cooperating airgap faces extending parallelly to the longitudinal direction of said path so that the airgap face of said one structure passes over the air gap face of said other structure during the movement of said vehicle along said path under the action of a traveling magnetic field produced by said magnetic field structure, when energized;
   said support and guide means being adapted to reduce the distance separating confronting portions of the air gap faces of said structures at said stop-and-go points pursuant to the releasable catching of coincident interfitting projections and recesses of said support and guide means.

3. A conveyance device comprising :
   a vehicle,
   a linearly extending track for said vehicle,
   support members on said vehicle adapted to run on said track,
   a linear induction motor device having a magnetic field structure and an armature structure, one of said structures being movable with said vehicle, the other structure extending along said track,
   said other structure defining aligned air gap faces extending parallelly to said track, said one structure defining a cooperating air gap face adapted to pass over said aligned air gap faces parallelly thereto and closely spaced therefrom to drive said vehicle along said track under the action of a magnetic field traveling between confronting portions of said air gap faces of said structures upon energizing of said magnetic field structure,
   said support members and said track comprising a plurality of roller means spaced apart in the direction of said track and in rolling engagement with runner means longitudinally extending in the direction of said track,
   said runner means comprising a plurality of longitudinally spaced apart recesses, shaped to accommodate a circumferential portion of said roller means,
   said roller means and said recesses of said runner means being positioned to catch said vehicle at predetermined stop-and-go points of said track by interfitting of coinciding roller means and recesses thereby diminishing at said stop-and-go points the spacing of the air gap faces of said structures so as to increase the starting force exerted on said vehicle by said magnetic field permitting said roller means to leave said recesses upon energizing of said magnetic field structure.

4. A conveyance device as set forth in claim 3, said magnetic field structure being carried by said vehicle, said armature structure comprising stationary armature plates arranged along said track.

5. A conveyance device as set forth in claim 3, said armature structure being carried by said vehicle, said magnetic field structure comprising magnetic field units regularly spaced apart along said track.

6. A conveyance device as set forth in claim 5, said armature structure being substantially only composed of electrically conductive and non-magnetizable material to diminish the attraction forces acting between the air gap faces of said structures.

7. A conveyance device as set forth in claim 3, said runner means being stationary and extending along the entire length of said track, said roller means being carried by said vehicle.

8. A conveyance device as set forth in claim 7, said runner means comprising a pair of parallel guide rails cooperating with two pairs of rollers having different track gages, said rails comprising for said pairs of rollers different running surfaces having notches to accomodate the corresponding rollers, at each stop-and-go point.

9. A conveyance device as set forth in claim 7, said runner means comprising a generally flat single running area having a plurality of non-equidistant transversely extending grooves at each stop-and-go point to accomodate a corresponding number of mating roller means carried by said vehicle.

10. A conveyance device as set forth in claim 3, said runner means being carried by said vehicle to run on aligned idle rollers spaced apart along the entire length of said track.

11. A conveyance device as set forth in claim 10, said runner means comprising at least a pair of runners longitudinally extending along said vehicle laterally of said one structure, each runner running on a set of rollers spaced apart along said track in such a manner that the runner engages always at least two rollers and that the recesses of the runner coincide with a corresponding number of rollers only at said stop-and-go points.

12. A conveyance device comprising :
a vehicle,
two coplanar sets of parallel tracks for said vehicle to form a gridwork of crossing tracks,
a first set of support members on said vehicle adapted to run on the tracks of one set,
a second set of support members on said vehicle adapted to run on the tracks of the other set,
a linear induction motor system having a composite selectively energizable magnetic field structure and an armature structure, one of said structures being movable with said vehicle, the other structure being coextensive with said gridwork,
said other structure defining a plurality of substantially coplanar air gap faces, said one structure defining a cooperating air gap face adapted to pass over said coplanar air gap faces closely spaced therefrom to drive said vehicle along selected tracks according to selective energizing of said magnetic field structure,
said first and said second set of support members being disposed peripherally of said one structure,
said support members and portions of said tracks at predetermined intersections thereof comprising coinciding interfitting projections and recesses to mechanically catch said vehicle at said intersections and to reduce the distance between the air gap faces of said structures.

13. A conveyance device as set forth in claim 12, said support members comprising at least two pairs of recessed runners, said tracks comprising pairs of rollers the spacings of which in the direction of the corresponding tracks coinciding only at said predetermined intersections with the spacings of the recesses of said runners.

14. A conveyance device as set forth in claim 13, said rollers being shaped to enhance the disengagement of the support members from the rollers associated with the non-selected direction of displacement upon restarting of the vehicle.

15. A conveyance device as set forth in claim 13, said rollers being supported for resilient lateral movement.

16. A conveyance device comprising :
a vehicle,
a stationary guide way for said vehicle,
support members on said vehicle running on said guide way,
a linear induction motor to drive said vehicle along said guide way and including a magnetic field structure and an armature structure, one of said structures being movable with said vehicle, the other structure extending along said guide way,
said guide way comprising at predetermined points surface inequalities shaped and positioned to accomodate peripheral mating parts of said support members of said vehicle to position said vehicle at said points under the action of the weight of said vehicle and to reduce the distance between said structures thereby to increase the restarting force exerted by said motor on said vehicle upon energizing of said magnetic field structure in order to permit the vehicle to lift and to disengage said surface inequalities.

17. A conveyance device for driving a vehicle along a predetermined path, comprising :
a linear induction motor to drive said vehicle along said path and including a magnetic field structure and an armature structure, one of said structures being movable with said vehicle, the other structure extending along said path,
guide means to guide said vehicle and said one structure along said path,
said guide means being adapted to impart to said one structure at predetermined points of said path sudden movements transverse of said path to locally reduce the distance separating said one structure from said other structure thereby to position said vehicle at standstill at said points upon de-energizing of said magnetic field structure and to permit restarting of said vehicle upon re-energizing of said magnetic field structure.

18. A conveyance device comprising :
a vehicle,
a pair of tracks for said vehicle, crossing at an angle,
first support members on said vehicle adapted to run on one of said tracks,
second support members on said vehicle adapted to run on the other of said tracks,
said first and second support members extending on said vehicle in general directions crossing at an angle corresponding to said crossing angle of said tracks, a linear induction motor system having a magnetic field structure and an armature structure, one of said structures being movable with said vehicle, the other structure extending along both tracks in a manner permitting to propel said vehicle along a selected branch track of said crossing tracks, said first and second support members and portions of said tracks at the intersections thereof comprising coincident mating projections and recesses engaging each other to catch said vehicle at said intersection and to reduce the distance between said structures at said intersection.

* * * * *